United States Patent
Malatto et al.

[11] Patent Number: 6,082,318
[45] Date of Patent: Jul. 4, 2000

[54] SPARK-IGNITION INTERNAL COMBUSTION ENGINE HAVING A COMBUSTION CHAMBER PROVIDED WITH THREE VALVES AND A CENTRAL SPARK-PLUG

[75] Inventors: Dante Rodolfo Malatto; Vladimiro Patrone, both of Orbassano, Italy

[73] Assignee: C.R.F. Societa Consortile per Azioni, Orbassano, Italy

[21] Appl. No.: 09/020,338

[22] Filed: Feb. 9, 1998

[30] Foreign Application Priority Data

Aug. 1, 1997 [IT] Italy ................... TO97A0703

[51] Int. Cl.$^7$ ........................................ F02F 1/00
[52] U.S. Cl. ........................................ 123/193.5
[58] Field of Search ........................... 123/193.5

[56] References Cited

U.S. PATENT DOCUMENTS

| | | | |
|---|---|---|---|
| 4,621,597 | 11/1986 | Kawada et al. | 123/193.5 |
| 5,511,520 | 4/1996 | Regueiro | 123/193.5 |
| 5,551,393 | 9/1996 | Amano et al. | 123/193.5 |
| 5,570,669 | 11/1996 | Regueiro | 123/193.5 |
| 5,582,147 | 12/1996 | Kim | 123/302 |

FOREIGN PATENT DOCUMENTS

| | | | |
|---|---|---|---|
| 500123 | 8/1992 | European Pat. Off. | 123/193.5 |
| 4119594 | 2/1993 | Germany | 123/193.5 |
| 4222801 | 1/1994 | Germany | 123/193.5 |

*Primary Examiner*—John Kwon
*Attorney, Agent, or Firm*—Sughrue, Mion, Zinn, Macpeak & Seas, PLLC

[57] ABSTRACT

In a spark ignition internal combustion engine, at least one cylinder is provided in the engine block and a corresponding combustion chamber is formed in the cylinder head for each cylinder. Two intake valves and an exhaust valve are associated with each combustion chamber with the spark-plug for each combustion chamber being arranged in the center between the three valves. The surface of the cavity within the head defining the combustion chamber is roof-shaped with two inclined surface portions in which the two intake ports and the exhaust port are respectively located. In a plane perpendicular to the cylinder axis, the combustion chamber has a pseudo-triangular profile having rounded apices locally following the profile of the three intake and exhaust ports.

2 Claims, 4 Drawing Sheets

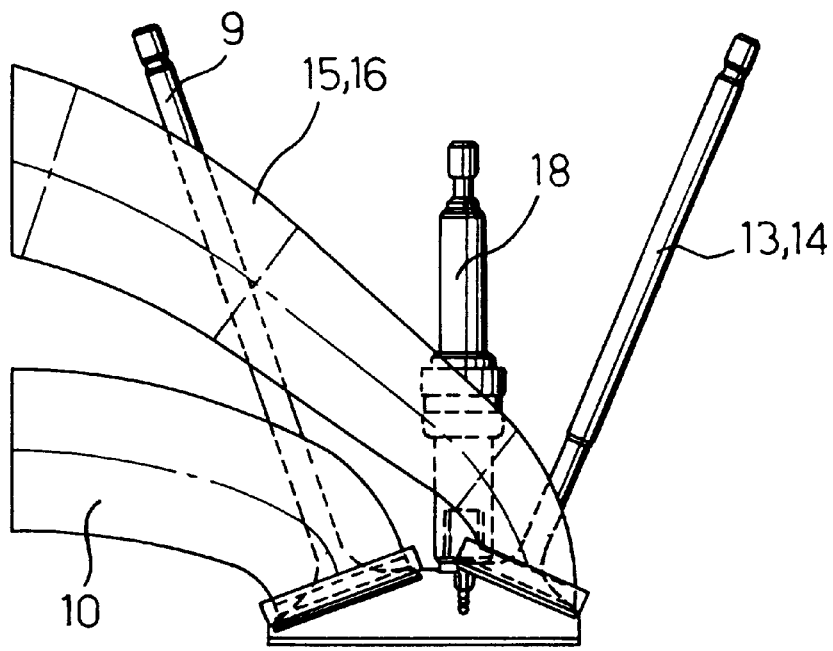
Fig_7
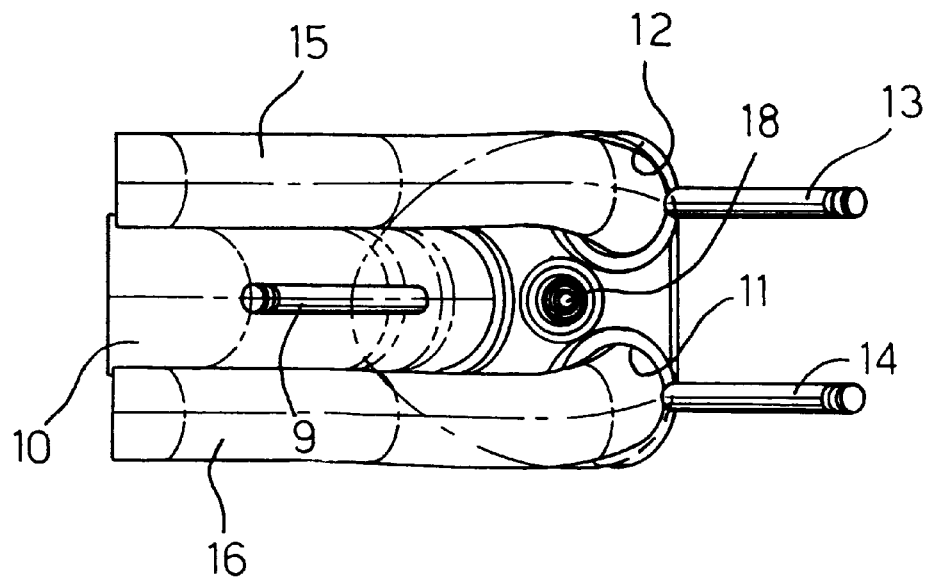
Fig_8

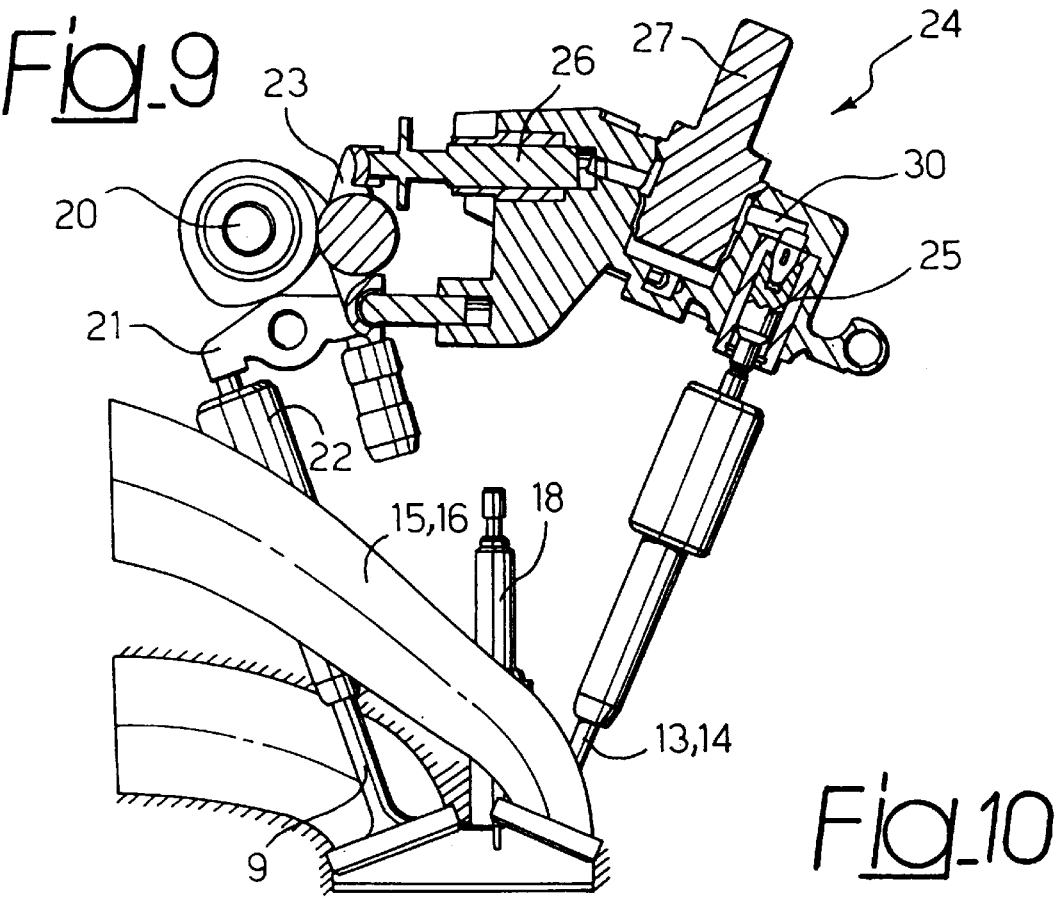
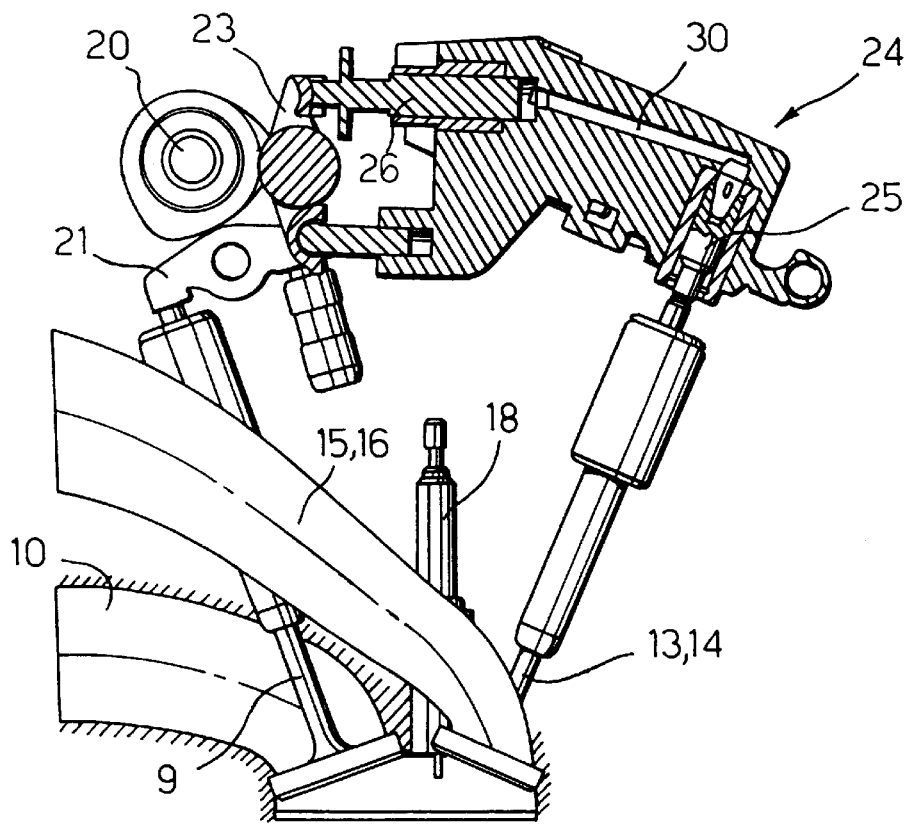

6,082,318

SPARK-IGNITION INTERNAL COMBUSTION ENGINE HAVING A COMBUSTION CHAMBER PROVIDED WITH THREE VALVES AND A CENTRAL SPARK-PLUG

BACKGROUND OF THE INVENTION

The present invention relates to spark-ignition internal combustion engines, of the type comprising an engine block, defining at least one cylinder, a cylinder head mounted on the engine block, on whose lower surface a cavity is formed defining a combustion chamber associated with each cylinder, and at least one intake port and at least one exhaust port opening on said cavity and forming the seats for intake and exhaust valves, as well as a spark-plug associated with each combustion chamber.

SUMMARY OF THE INVENTION

The object of the present invention is that of providing a specific combustion chamber arrangement which at the same time has advantages from the standpoint of a reduced bulk, and the standpoint of efficient operation.

According to the general idea of solution which forms the subject of the present invention, the engine is characterized by the combination of the following features:

- with each combustion chamber there are associated three valves, whose axes are located at peripheral positions around the cylinder axis,
- the spark-plug of each combustion chamber is arranged at the centre in between said three valves,
- the spark-plug has a threaded portion screwed within a corresponding threaded seat formed within the head, said spark-plug threaded portion having a length not lower than 19 mm and a diameter not greater than 12 mm, said head having a cooling jacket surrounding at least partially said seat for the spark-plug.

As it will be clearly apparent from the following description, the general idea of solution is advantageous both because it has a reduced bulk, and because during operation of the engine it facilitates a concentration of the fuel/air mixture in proximity of the ignition area of the spark-plug, thus insuring the absence of hot spots, with the result of best efficiency of the combustion and anti-detonation features, while allowing high compression ratios and improving the thermo-dynamic efficiency of the engine and favouring the reduction of fuel consumption.

The use of a spark-plug having the above indicated non-standard dimensions provides various advantages. The adoption of a relatively reduced diameter enables intake and exhaust valves of greater diameter to be provided. The adoption of a spark-plug threaded portion having a length greater than the conventional standard length leaves the space necessary for providing the cooling jacket for the spark-plug seat. Therefore, a better cooling of the combustion chamber is obtained, while assuring the absence of detonation and pre-ignition even with a high compression ratio.

It is to be noted that in the past combustion chambers having three valves, typically two intake valves and one exhaust valve, have already been proposed. Usually this solution was proposed in order to enable the valves to be driven by a single cam shaft located within the head, while keeping the axes of the valves substantially parallel to the cylinder axis. In these known solutions, however, one or two spark-plugs where provided for each combustion chamber which were located peripherally with respect to the cylinder axis, exploiting the space between the exhaust valve and each intake valve. Engines having two exhaust valves and one intake valve for each combustion chamber have also been made. However, to Applicant's knowledge, nobody in the past has ever proposed a combustion chamber having only three valves and one spark-plug at the centre, just because nobody was ever able in the past to solve the problems which are encountered with this configuration with respect to the need of providing an adequate valve diameter and sufficient cooling of the combustion chamber. These problems have instead been solved by the present invention due to the features which have been described above.

It is also to be noted that in the past combustion chambers had already been proposed having only two diametrically opposite valves, or having four valves arranged at 90° relative to each other and the spark-plug at the centre. However, these solutions are not satisfactory from the standpoint of cost of manufacture and imply the provision of a combustion chamber having a relatively irregular surface.

According to the preferred embodiment of the invention, the three valves associated with each combustion chamber are constituted by two intake valves and one exhaust valve. The surface of the cavity within the cylinder head defining the combustion chamber is either flat or roof-shaped, with two inclined surface portions at which the two intake ports, on one side, and the exhaust ports, on the other side, are respectively located. In a cross-section perpendicular to the cylinder axis, the three valve ports have three profiles internally tangent to the circular profile of the cylinder, the spark-plug being arranged at the centre in between these three profiles and tangent thereto. In the plane of this cross-section, the combustion chamber has a pseudo-triangular profile, having rounded apices mating locally the profile of the intake and exhaust ports.

The surface of the combustion chamber has therefore a very simple and regular shape, so as to render the surface which is reached by the flame front very compact and regular. Due to the central arrangement of the spark-plug, the flame front starts from the centre of the combustion chamber and travels symmetrically up to the combustion periphery, while always encountering an extremely regular surface.

The particular shape of the chamber gives origin to extended areas on which at the end of the compression stage, squish of the gases towards the central area of the combustion chamber takes place. Indeed, by mating the plan shape of the combustion chamber with the circular plan shape of the cylinder three areas are defined, each formed by a circular segment and a cord, the piston pressing the mixture within the cylinder, causing the mixture to squish towards areas at lower pressure, i.e. towards the centre of the combustion chamber, so that a micro-turbulence is generated which is adapted for starting the combustion and favouring propagation thereof.

The geometry according to the invention may be used both on engines where fuel is injected upstream of the intake valve and on engines with gasoline directly injected into the combustion chamber, with a suitable arrangement of the injector. In this latter case, the provision of the spark-plug at the centre, according to the invention, provides space between the two intake valves for the injector. This arrangement is not possible in the known configurations having three valves and two side spark-plugs, nor it is possible in case of the configurations with four valves, where the valves occupy all the available space.

BRIEF DESCRIPTION OF THE INVENTION

Further features and advantages of the invention will become apparent from the description which follows with reference to the annexed drawings, given purely by way of non limiting example, in which:

FIG. 1 is a diagrammatic perspective view of the hollow spaces present in the head of an internal combustion engine according to the invention, defining the combustion chamber and the intake and exhaust conduits, with the addition of the spark-plug and the valve stems, FIG. 2 is a side view of the assembly of FIG. 1, FIG. 3 is a view in a plane perpendicular to the cylinder axis, FIG. 4 is a cross-sectional view taken along line IV—IV of FIG. 3, FIG. 5 is a cross-section taken along line V—V of FIG. 2, FIG. 6 is a variant of FIG. 4, FIG. 7, 8 are an elevational view and a plan view of a further variant, FIG. 9 is a diagrammatic elevational view, partially in cross-section, of a further embodiment of the invention, and FIG. 10 shows a variant of FIG. 9.

DETAILED DESCRIPTION OF THE INVENTION

Figure 2:
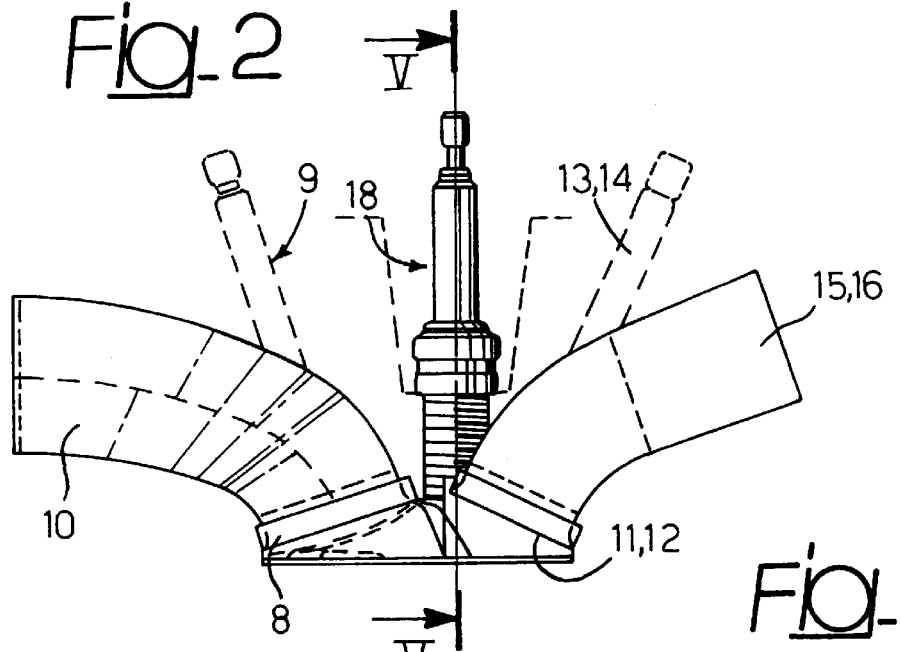
Figure 1:
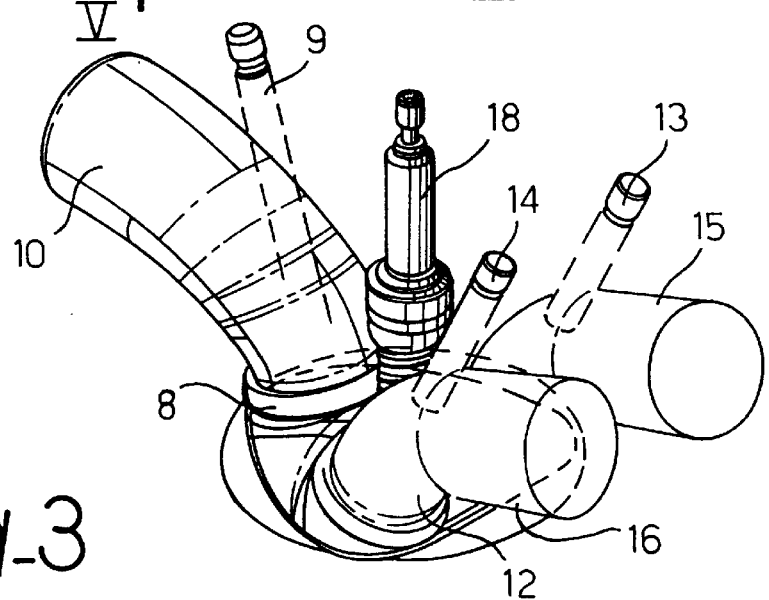

In the drawings, reference numeral 1 designates the block, diagrammatically shown, of a spark ignition internal combustion engine, comprising at least one cylinder 2 in which a piston (not shown) is slidably mounted. Above the block 1 a cylinder head 3 is mounted on whose lower surface a cavity 4 is formed defining the combustion chamber associated with cylinder 2.

FIGS. 1–5 show an embodiment in which the surface of cavity 4 is roof-shaped and has two substantially planner 5, 6 surface portions (FIG. 3) which inclined and converging towards an upper edge 7.

At the centre of surface portion 5 a single exhaust port 8 opens forming the seat for an exhaust valve 9. The exhaust port 8 defines the terminal end of an exhaust conduit 10 formed within the cylinder head 3.

As already indicated, the figures of the annexed drawings are a virtual illustration of the combustion chamber, in which the hollow spaces of the head have been shown as solid parts. Furthermore, the drawings do not show the structure of the timing system driving the valves associated with the cylinder in detail, since these constructive features may be made in any known way and do not fall within the scope of the present invention. Furthermore, the deletion of these details from the drawings renders the latter simpler and easier to understand.

On surface portion 6 two intake ports 11, 12 open which form the seats for two intake valves 13, 14 and defining the terminal ends of two intake conduits 15, 16 formed within the cylinder head.

Figure 3:
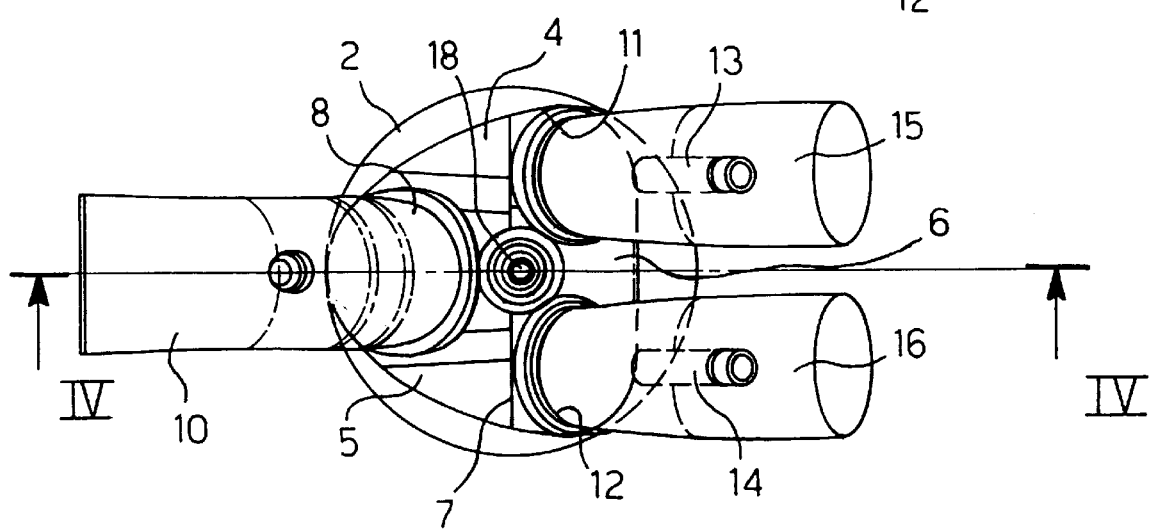

As visible in FIG. 3, in a plane perpendicular to the cylinder axis, the profiles of the intake and exhaust ports 8, 11, 12 are internally tangent to the circular profile of cylinder 2, and the combustion chamber defined by cavity 4 has a pseudo-triangular profile, with the apices rounded and locally following the profiles of the above-mentioned three ports. According to the invention, a spark-plug 18 is associated with each combustion chamber 4 and arranged at the centre in between the three ports 8, 11, 12 and has a profile in plan view which, in the illustrated embodiment (FIG. 3) is substantially tangent to the three profiles of the above-mentioned ports. In the arrangement shown by way of example in the annexed drawings, the spark-plug 18 has its axis arrange parallel to the cylinder axis. Yet with reference to FIG. 3, the two intake ports 11, 12 are arranged on the surface portion 6 which has been mentioned above, symmetrically and on both sides of plane IV—IV, port 8 being instead arranged at the centre of the surface portion 5 with respect to the above-mentioned plane IV—IV. The axis of the spark-plug 18 lies on the above-mentioned plane IV—IV (see FIG. 3) and is very close to the edge 7 of the combustion chamber.

Due to the above described features, the engine according to the invention simultaneously provides advantages of reduced bulk and efficient operation.

The central arrangement of the spark-plug causes the flame front to start from the centre of the combustion chamber and travel in a symmetrical way up to edges of the chamber, while always encountering an extremely regular surface.

The specific shape of the chamber gives origin to extended areas at which during the final part of the compression stage a squish of the gas takes place towards the central area of the combustion chamber. The reason of this is that the overlapping of the pseudo-triangular plan shape of the combustion chamber and the circular plan shape of the cylinder defines three areas each formed by a circular segment and a cord, which are the areas at which the piston compresses the mixture present within the cylinder causing it to be shooted towards areas at lower pressure, i.e. towards the centre of the combustion chamber, thus generating a micro-turbulence suitable for starting the combustion and favouring travel thereof.

Figure 4:
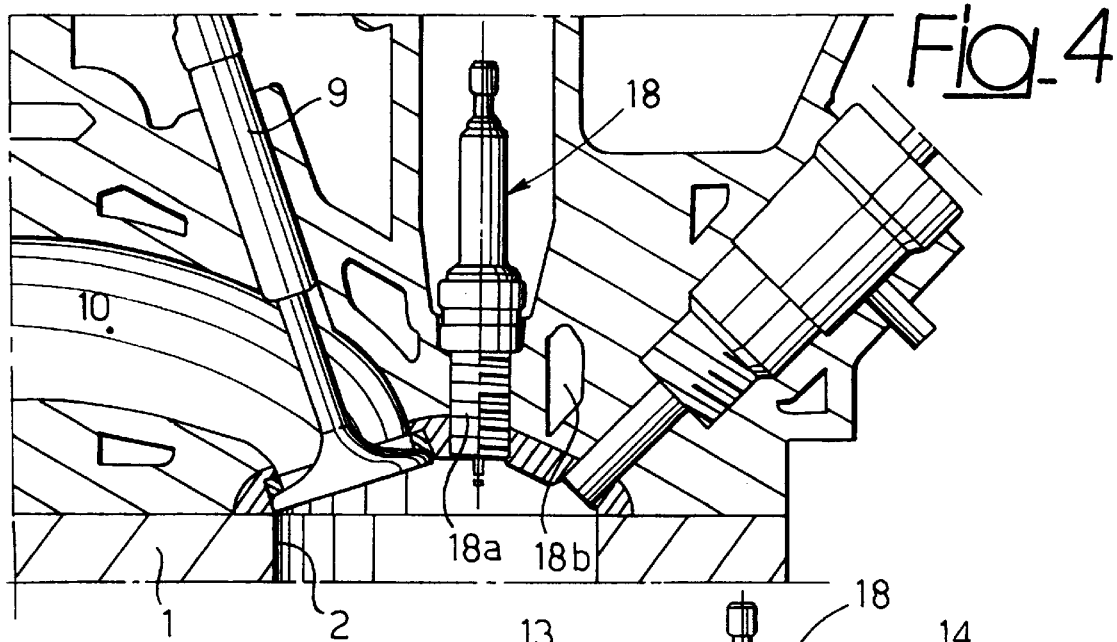
Figure 5:
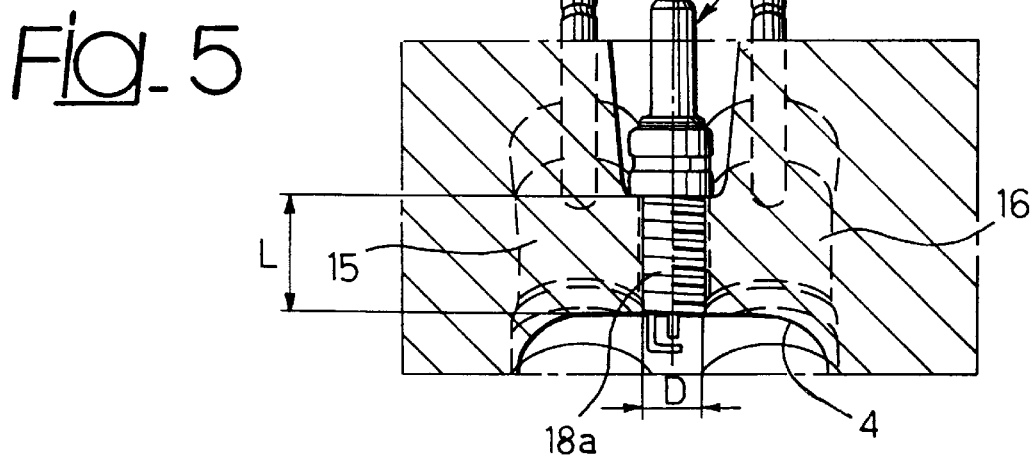

The spark-plug 18 has a threaded portion 18a having dimensions different from the conventional standard dimensions, which is screwed within a co-operating threaded seat of the head. The portion 18a has a length L (see FIG. 5) for instance 19 mm, and anyhow not lower than that and a diameter D which is 12 mm and anyhow not greater than that, so as to leave space for a cooling jacket 18b (FIG. 4).

The geometry according to the invention may be used both on engines wherein fuel is injected upstream of the intake valve and on engines wherein gasoline is directly injected into the combustion chamber, by a suitable arrangement of the injector. FIG. 4 shows an injector 40 in an application of this latter type.

Figure 6:
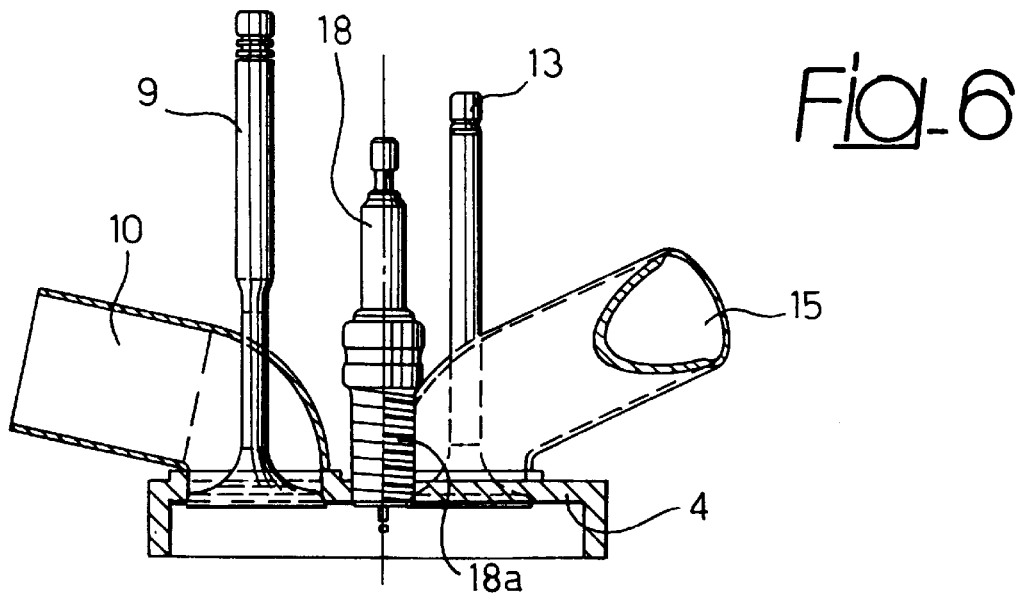

FIG. 6 shows a variant wherein the combustion chamber is flat. In both the illustrated embodiments, the preferred case is that in which two of the three valves are intake valves and the third valve is an exhaust valve, even if the opposite case is not excluded. The two twin valves preferably have their axes lying on a plane parallel to the axis of the crank shaft, so as to enable a single cam shaft to be adopted for driving thereof.

Naturally, while the principle of the invention remains the same, the details of construction and the embodiments may widely vary with respect to what has been described and illustrated, without departing from the scope of the present invention.

For example, the combustion chamber can be formed completely within the upper wall of the piston. This case would correspond to the solution shown in FIG. 6 if the height of cavity 4 is reduced to zero.

FIGS. 7, 8 show a variant in which the intake and exhaust conduits are all directed towards the same side of the cylinder head, on which they open, respectively for connection with the intake and exhaust manifold. The intake conduits are more spaced apart from each other in proximity of the spark-plug, in order to leave a space sufficient for mounting of the latter, whereas they come closer to each other in proximity of the valve seats (FIG. 8). The spark-plug is located centrally between the seats of the two intake valves and the exhaust valve. The axis connecting the centres of the seats for the two intake valves is parallel to the axis of the crank shaft and the stems of the two intake valves lie in a plane parallel to the crank shaft. The combustion chamber may have a heart-shape or simply a roof-shape. Furthermore, the seats for the intake valves lie on a plane parallel to the crank shaft. Differently from what is illustrated in FIGS. 7, 8, the above-mentioned plane including these seats might also be orthogonal to the cylinder axis (as in the case of FIG. 6).

FIG. 9 shows a variant of FIG. 7, wherein the intake valves 13, 14 and the exhaust valve 9 are controlled by a single cam shaft 20. The exhaust valve 9 is driven by means of a rocker arm 21 and a hydraulic tappet 22. The intake valves 13, 14 are driven by means of a rocker arm 23 and an electronically controlled hydraulic device 24 of the type forming the subject of European patent application No. 97830123.2 of same Applicant, including a piston 25 hydraulically connected to a piston 26 driven by the rocker arm 23, by means of a pressure chamber which can be discharged by means of a solenoid valve 27. FIG. 10 shows a simplified variant, with no solenoid valve, in which the hydraulic connection between the two pistons 25, 26 is permanent. By this solution one of the two intake valves can also be eliminated.

What is claimed is:

1. Spark ignition internal combustion engine, comprising an engine block, including at least one cylinder, a cylinder head mounted on the engine block, on whose lower surface a cavity is formed defining a combustion chamber associated with said cylinder, at least one intake port and at least one exhaust port opening on said cavity and defining seats for intake and exhaust valves, and a spark-plug associated with each combustion chamber, said engine being characterized by the combination of the following features:

three valves are associated with each combustion chamber, having axes located at peripheral positions around the cylinder axis, the spark-plug of each combustion chamber is arranged at the center in between said three valves, and the spark-plug has a threaded portion screwed within a co-operating threaded seat formed within the head, said spark-plug threaded portion having a length not lower than 19 mm and a diameter not greater than 12 mm, said head having a cooling jacket surrounding at least partially said seat for the spark-plug, wherein two intake valves and one exhaust valve are associated with each combustion chamber, wherein the surface of the cavity within the head defining the combustion chamber is roof-shaped, and has two inclined surface portions at which the two intake ports and the exhaust port are respectively located, wherein in a cross-section perpendicular to the cylinder axis, the three valve ports have profiles substantially tangent internally to the circular profile of the cylinder and the spark-plug has a profile substantially tangent internally to the profiles of said ports, wherein is a plan perpendicular to the cylinder axis, the combustion chamber has a pseudo-triangular profile having rounded apices locally following the profile of the three intake and exhaust ports, wherein the spark-plug has its axis substantially parallel to the cylinder axis and lying in plane including the cylinder axis and being in a symmetry plane with respect to the two intake ports, said axis of the spark-plug being close to an edge defined by the two said surface portions of the surface of the cavity defining the combustion chamber, and wherein the two intake valves have their axes lying on a plane parallel to the axis of the crank shaft and are driven by a single cam shaft.

2. Engine according to claim 1, wherein said cam shaft drives the intake valves by means of an electronically controlled hydraulic device.

\* \* \* \* \*